United States Patent [19]
Doong

[11] Patent Number: 5,997,612
[45] Date of Patent: Dec. 7, 1999

[54] PRESSURE SWING ADSORPTION PROCESS AND APPARATUS

[75] Inventor: Shain-Jer Doong, Millington, N.J.

[73] Assignee: The BOC Group, Inc., Murray Hill, N.J.

[21] Appl. No.: 09/122,559

[22] Filed: Jul. 24, 1998

[51] Int. Cl.$^6$ ............................................. B01D 53/053
[52] U.S. Cl. ........................ 95/101; 95/102; 95/103; 95/105; 95/130; 96/130; 96/144
[58] Field of Search .............. 95/96–98, 100–105, 95/130, 138; 96/108, 130, 144

[56] References Cited

U.S. PATENT DOCUMENTS

| | | | |
|---|---|---|---|
| 3,564,816 | 2/1971 | Batta | 95/100 |
| 3,636,679 | 1/1972 | Batta | 95/100 |
| 4,070,164 | 1/1978 | Miwa et al. | 95/101 |
| 4,077,780 | 3/1978 | Doshi | 95/100 |
| 4,315,759 | 2/1982 | Benkmann | 95/97 X |
| 4,371,380 | 2/1983 | Benkmann | 95/97 |
| 4,512,779 | 4/1985 | Haÿ | 95/100 |
| 4,519,813 | 5/1985 | Hagiwara et al. | 95/101 |
| 4,614,525 | 9/1986 | Reiss | 95/96 |
| 4,723,966 | 2/1988 | Fuderer | 95/98 |
| 4,756,723 | 7/1988 | Sircar | 95/103 |
| 4,784,672 | 11/1988 | Sircar | 95/98 X |
| 4,857,083 | 8/1989 | Di Martino | 95/103 X |
| 4,892,565 | 1/1990 | Schmidt et al. | 95/101 |
| 4,915,711 | 4/1990 | Kumar | 95/101 |
| 4,969,935 | 11/1990 | Hay | 95/98 |
| 5,015,272 | 5/1991 | Okada et al. | 95/100 X |
| 5,051,115 | 9/1991 | Leitgeb et al. | 95/101 X |
| 5,232,473 | 8/1993 | Kapoor et al. | 95/101 |
| 5,246,676 | 9/1993 | Hay | 95/98 X |
| 5,330,561 | 7/1994 | Kumar et al. | 95/105 X |
| 5,656,067 | 8/1997 | Watson et al. | 95/101 |
| 5,656,068 | 8/1997 | Smolarek et al. | 95/101 |
| 5,711,787 | 1/1998 | Neill et al. | 95/96 |
| 5,846,294 | 12/1998 | Doong | 95/101 X |

*Primary Examiner*—Robert Spitzer
*Attorney, Agent, or Firm*—Michael F. Esposito; Salvatore P. Pace

[57] ABSTRACT

A process and apparatus for separating the components of a gas mixture by PSA in a four-vessel adsorption system operated as two pairs of adsorption vessels. The vessels of each pair are operated 180° out of phase, such that one vessel of a pair is in the adsorption mode while the other vessel of the pair is undergoing adsorbent regeneration. The apparatus includes the two pairs of adsorption vessels, an intermediate gas storage reservoir which is used to temporarily store gas removed from the nonadsorbed gas outlet end of the adsorption vessels for use in various steps of the process, one gas blower and a pair of vacuum pumps. The adsorption cycle is such that the pairs of adsorption vessels are operated out of phase relative to each other and the blower and both vacuum pumps are in continuous operation throughout the process. The process and system are particularly well adapted to the separation of nitrogen from oxygen by vacuum swing adsorption.

20 Claims, 3 Drawing Sheets

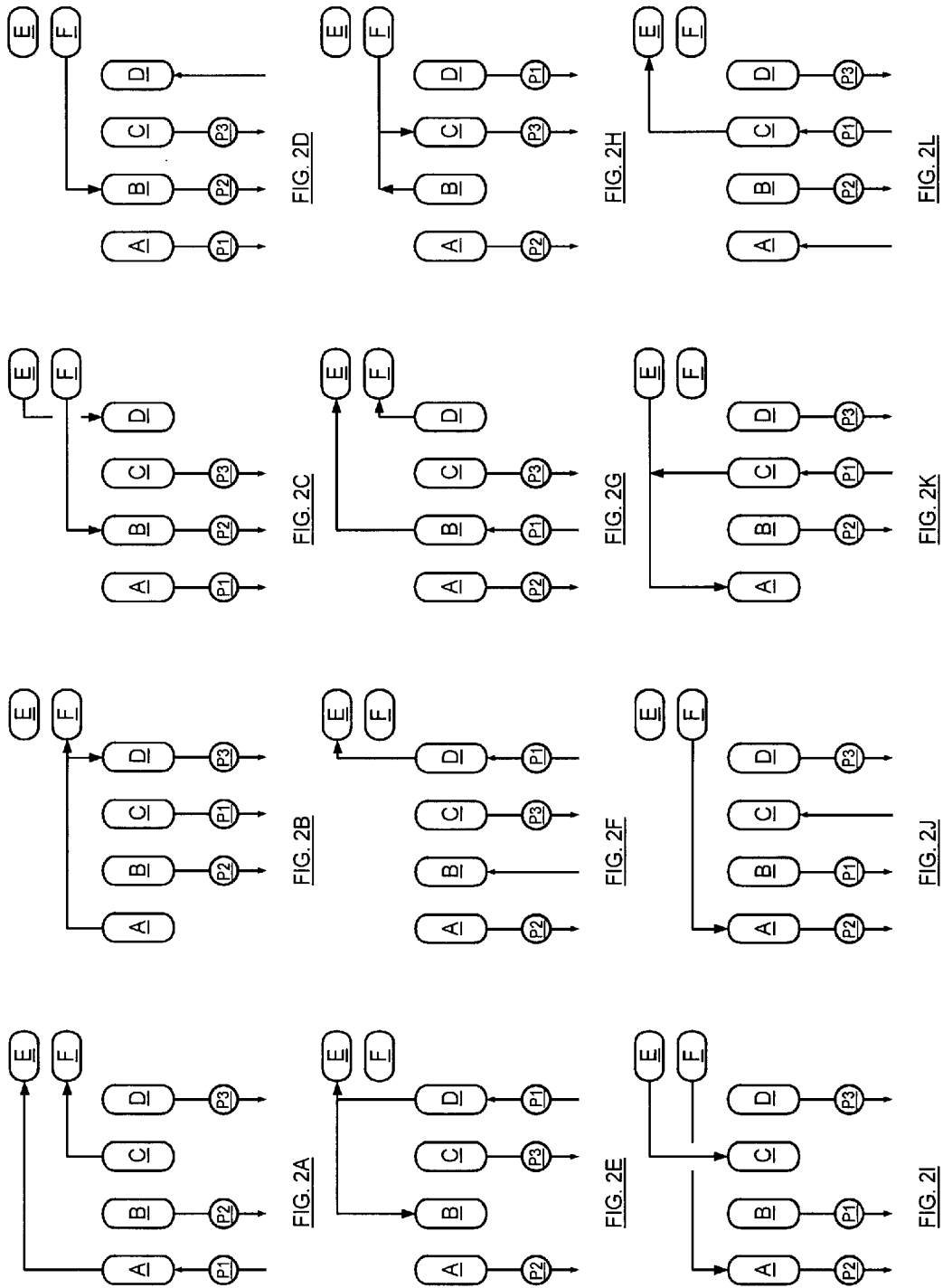

PRESSURE SWING ADSORPTION PROCESS AND APPARATUS

FIELD OF THE INVENTION

This invention relates to a process for the separation of the components of a gas mixture, and more particularly to the separation of gas components by a novel pressure swing adsorption (PSA) process using a four-bed adsorption system. The invention is especially well adapted to the large scale production of oxygen from air by PSA at pressures near atmospheric pressure.

BACKGROUND OF THE INVENTION

PSA processes are commonly used for the production of oxygen when small to intermediate quantities, i. e., up to 100 TPD (tons per day) of oxygen is required. Typical small to intermediate size plants use two-bed or three-bed adsorption systems.

However, when quantities greater than 100 TPD are to be produced by PSA, it is generally necessary to use systems comprised of four or more beds, because very large two-bed or three-bed systems are too costly to construct, ship and operate. Typically, power consumption of small bed units is currently between about 0.35 and 0.45 Kwh/NmO$_2$ (kilowatt hours per normal cubic meter of oxygen produced). In order for large volume PSA systems to compete with cryogenic air separation units of the same capacity, they must have low power consumption demand. To be competitive, it is generally considered that large scale PSA plant power demand should not significantly exceed about 0.45 Kwh/NmO$_2$.

Efforts to reduce the operating cost of large scale PSA plants are constantly made. U.S. Pat. No. 5,656,068 discloses a four bed PSA plant in which the beds are operated as two pairs of 2-bed systems, which is referred to as a 2×2 cycle/system. Each pair of beds of the disclosed system is operated 180° out of phase and the two pairs of beds are operated out of phase by one-half of a half-cycle. A stated advantage of the process of this patent is that it uses a combination of positive displacement and centrifugal pumps to perform the various gas pumping operations. The system requires two air compressors, one of which periodically is in the idle or vent mode, and two vacuum pumps.

The operating costs of a four-bed PSA plant could be considerably reduced if the plant could be operated in such a manner that fewer than four pumps were required. The present invention provides a system and operating cycle that possesses this advantage.

SUMMARY OF THE INVENTION

The present invention provides a gas adsorption process and multiple adsorption vessel system which derives energy savings benefit from the particular arrangement of the equipment and the unique cycle of operation. The system includes three gas pumps of types which provide optimum efficiency during operation of their assigned tasks. At least one of the gas pumps, and preferably all three pumps, are operated on a continuous basis throughout the adsorption cycle. In a preferred embodiment, the system includes a temporary gas storage tank to receive partially purified gas cocurrently discharged gas from the adsorption vessels of the system, and makes use of the gas contained in the temporary storage tank for purging the adsorption vessels.

In a broad embodiment, the invention comprises a pressure swing adsorption process for producing first component-enriched gas from a gas mixture containing first and second components in a system comprising four adsorption zones arranged in parallel, each adsorption zone containing an adsorbent which selectively adsorbs the second component; a first gas pumping means; and one or more second gas pumping means; comprising repeatedly performing in each adsorption zone the following sequence of steps:

(i) producing first component-enriched gas by cocurrently introducing the gas mixture into the adsorption zone at a selected adsorption pressure and cocurrently removing first component-enriched gas therefrom;

(ii) partially depressurizing the adsorption zone by cocurrently removing partially fractionated gas therefrom;

(iii) further depressurizing the adsorption vessel by countercurrently withdrawing second component-enriched gas therefrom;

(iv) further depressurizing the adsorption vessel by countercurrently withdrawing second component-enriched gas therefrom;

(v) purging the adsorption zone by introducing (a) first component-enriched gas, (b) partially fractionated gas or (c) combinations of these countercurrently thereinto while countercurrently withdrawing gas therefrom; and (vi) at least partially repressurizing the adsorption vessel by introducing: (a) first component-enriched gas countercurrently thereinto, (b) partially fractionated gas countercurrently thereinto, (c) the gas mixture cocurrently thereinto, or (d) combinations of two or more of (a), (b) and (c);

the first gas pumping means being used exclusively for steps (i) and (iii) in all adsorption vessels and the one or more second gas pumping means being used exclusively for steps (iv) and (v) in all vessels.

In a preferred embodiment, the first gas pumping means is in continuous service throughout the process.

In another preferred embodiment, the one or more second gas pumping means is in continuous service throughout the process.

In another preferred embodiment, the first gas pumping means is positive displacement gas pumping means and the one or more second gas pumping means are non-positive displacement gas pumping means.

In another preferred embodiment, the one or more second gas pumping means comprises two gas pumping means.

In another preferred embodiment, one second gas pumping means is used exclusively for two adsorption zones and another second gas pumping means is used exclusively for the other two adsorption zones.

In another preferred embodiment, two of the four adsorption zones comprise a first pair of adsorption zones and the other two of the four adsorption zones comprise a second pair of adsorption zones and the phasing of each pair of adsorption zones is such that the cycle of one adsorption zone of a pair lags behind the cycle of the other adsorption zone of that pair by one half-cycle.

In another preferred embodiment, step (vi) of the broad process comprises cocurrently introducing the gas mixture into the adsorption vessel. In another preferred embodiment, step (vi) comprises countercurrently introducing first component-enriched gas into the adsorption vessel and then cocurrently introducing the gas mixture thereinto. In another preferred embodiment, step (vi) comprises countercurrently introducing first component-enriched gas into the adsorption vessel, then countercurrently introducing first component-enriched gas into the adsorption vessel while cocurrently introducing the gas mixture thereinto, then cocurrently introducing the gas mixture into the adsorption vessel.

In another preferred embodiment of the invention, the selected adsorption pressure is in the range of about 1 to about 20 bara. In another preferred embodiment, during step (iv) the pressure in the adsorption zone is reduced to about 0.1 to about 2 bara.

In another preferred embodiment, the gas mixture is air. In a preferred aspect of this preferred embodiment, step (vi) comprises at least partially cocurrently introducing the air into the adsorption vessel at atmospheric pressure. In another preferred aspect of this preferred embodiment, the first component is oxygen and the second component is nitrogen. In another preferred aspect of this preferred embodiment, the selected adsorption pressure is about 1 to about 5 bara. In another preferred aspect of this preferred embodiment, during step (iv) the adsorption vessel is countercurrently evacuated to subatmospheric pressure.

In another embodiment, the invention comprises a system for fractionating a feed gas comprising:

(a) four adsorption zones arranged in parallel, each adsorption zone having an inlet and outlet and containing an adsorbent which selectively adsorbs one component of the feed gas;

(b) a gas storage container;

(c) positive displacement gas pumping means having an inlet and an outlet;

(d) first and second non-positive displacement gas pumping means, each having an inlet and an outlet;

(e) feed conduit means with valve means connecting a feed gas source to the positive displacement gas pumping means inlet;

(f) conduit means with valve means connecting the positive displacement gas pumping means outlet to the inlet of each adsorption zone;

(g) first adsorption zone evacuation conduit means connecting the inlet of each adsorption zone to the positive displacement gas pumping means inlet, the first adsorption evacuation conduit means including valve means to selectively permit flow of gas from the inlet of each adsorption zone to the positive displacement gas pumping means inlet;

(h) first exhaust gas discharge conduit means with valve means connecting the positive displacement gas pumping means outlet to an exhaust gas discharge point;

(i) second adsorption zone evacuation conduit means connecting the inlets of two adsorption zones to the first non-positive displacement gas pumping means inlet, the second adsorption zone evacuation conduit means including valve means to selectively permit flow of gas from the inlet of either of the two adsorption zones to the first non-positive displacement gas pumping means inlet;

(j) third adsorption zone evacuation conduit means connecting the inlets of the two other adsorption zones to the second non-positive displacement gas pumping means inlet, the second adsorption zone evacuation conduit means including valve means to selectively permit flow of gas from the inlet of either of the two other adsorption zones to the second non-positive displacement gas pumping means inlet;

(k) second exhaust gas discharge conduit means connecting the first and the second non-positive displacement gas pumping means outlets to the exhaust gas discharge point;

(l) product gas conduit means connecting the outlet of each adsorption zone to a product gas discharge point, the product gas conduit means including valve means to selectively permit communication between each of the adsorption zone outlets and the product gas discharge point; and (m) storage conduit means connecting the outlets of each adsorption zone to the gas storage container, the gas storage conduit means including valve means to selectively permit communication between each of the adsorption zone outlets and the gas storage container.

In a preferred embodiment, the second and third adsorption evacuation conduit means of the system are combined, and the valve means of the combined evacuation conduit means selectively permits flow of gas from the inlet of any of the four adsorption zones to the inlet of either the first non-positive displacement gas pumping means or the second non-positive displacement gas pumping means.

In another preferred embodiment, the feed gas is ambient air and each adsorption zone contains an adsorbent which selectively adsorbs nitrogen from air.

BRIEF DESCRIPTION OF THE DRAWINGS

FIGS. 2A–2L are schematic representations of the steps of a preferred adsorption cycle carried out in the adsorption system of FIG. 1.

The same reference numerals and letters are used to represent the same or similar parts in the various drawings.

DETAILED DESCRIPTION OF THE INVENTION

The process of the invention can be used to separate any gas mixture amenable to 1 5 separation by PSA processes. For example, the process can be used to separate nitrogen from air, nitrogen from methane, carbon dioxide from carbon monoxide, etc.

To simplify discussion of the process, the invention will be described as it applies to its preferred application, i. e., the separation of the nitrogen component of air from the oxygen component using an adsorbent which selectively adsorbs nitrogen.

The four adsorption vessels of the system of the invention can be any vessels suitable for gas phase pressure swing adsorption processes. The adsorption vessels can be designed to accommodate vertical flow or horizontal flow of the gas being separated. Horizontal flow designs include radial bed arrangements, in which gas flows radially through the bed, usually from the peripheral part of the vessel to the center of the vessel. To simplify discussion of the invention, the adsorption vessels will be considered to be vertically oriented cylindrical vessels. The adsorption vessels are packed with an appropriate adsorbent in particulate form. In the case of nitrogen adsorption, the adsorbent is a nitrogen-selective adsorbent, for example, zeolite 5A, zeolite 13X or another group 1A ion-exchanged type X zeolite; a calcium- or other group 2A metal-exchanged type X zeolite; etc. The preferred nitrogen-selective adsorbent is type X zeolite containing lithium ions as all or most of its exchangeable cations. The particular adsorbent used in the process of the invention is a matter of choice and is not a part of the invention.

The adsorption vessels desirably contain a prepurification layer of desiccant, such as activated alumina or silica gel to remove water vapor contained in atmospheric air. Activated alumina is a preferred desiccant, since it also serves to remove carbon dioxide from the air, thereby reducing or eliminating the adsorption of carbon dioxide by the nitrogen adsorbent. Alternatively, the system may contain a separate air prepurification unit to remove water vapor and carbon dioxide from the air prior to its introduction into the adsorption vessels.

The invention can be better understood from the accompanying drawings in which the same reference letters or numerals are used to designate the same or similar pieces of equipment in different figures. Auxiliary equipment, including filters, heat exchangers and prepurification units, not necessary for an understanding of the invention, have been omitted from the drawings to simplify discussion of the invention.

Figure 1:
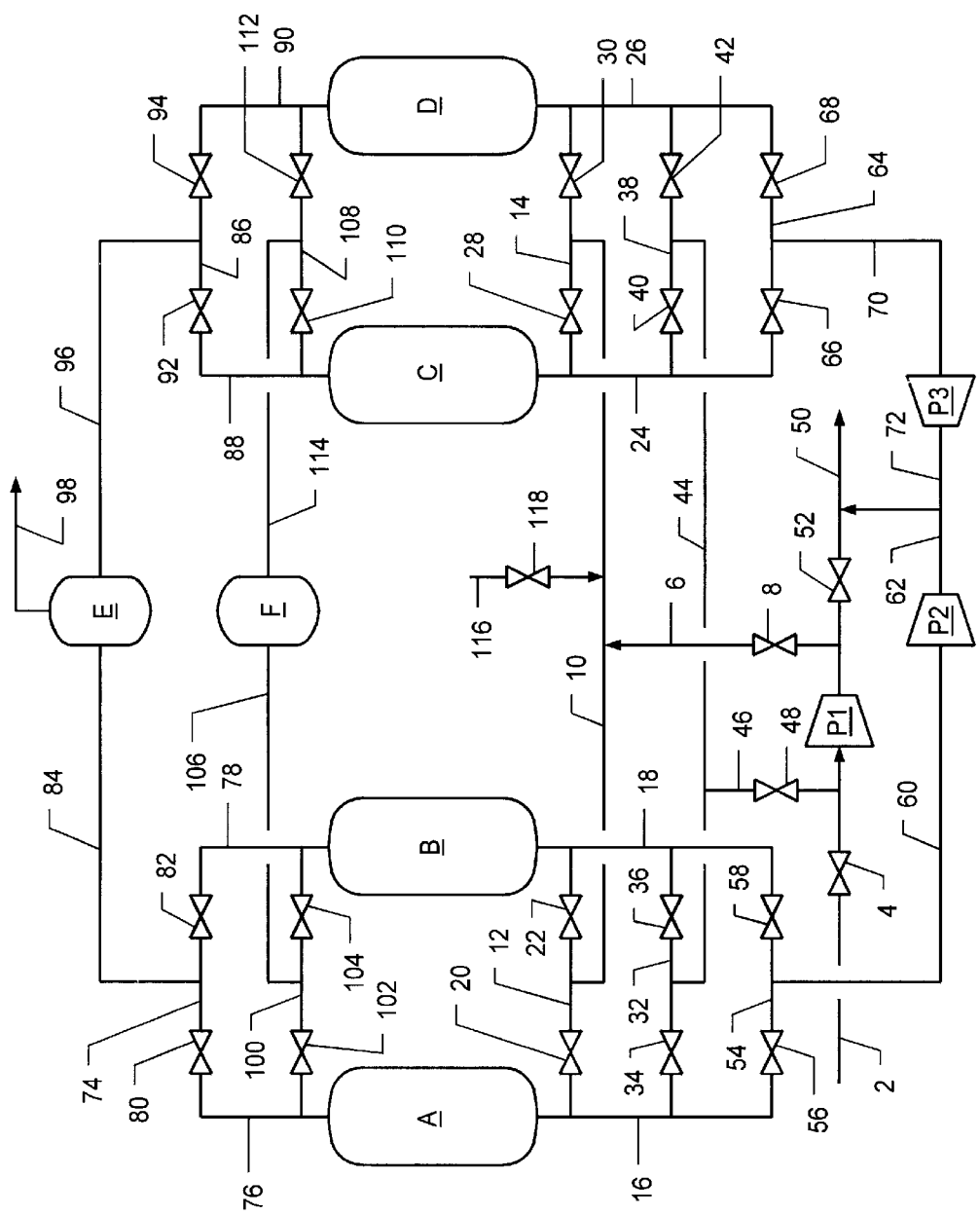
FIG. 1 is a schematic representation of an adsorption system that can be used in one embodiment of the invention.
Figure 3A:
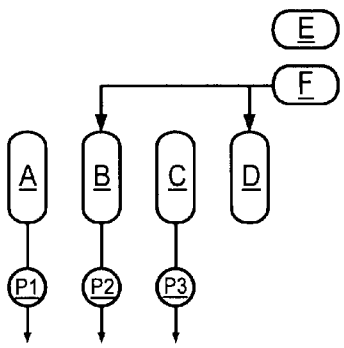
FIGS. 3A–3D are schematic representations of steps that are added to the cycle illustrated in FIGS. 2A–2F in a more preferred embodiment of the invention. The steps illustrated in FIGS. 3A, 3B, 3C and 3D are intended to be inserted into the FIG. 2 cycle after the steps illustrated in FIGS. 2B, 2D, 2H and 2J, respectively.
Figure 3B:
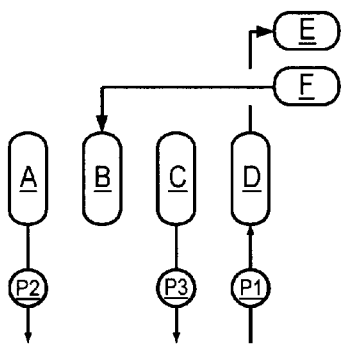
Figure 3C:
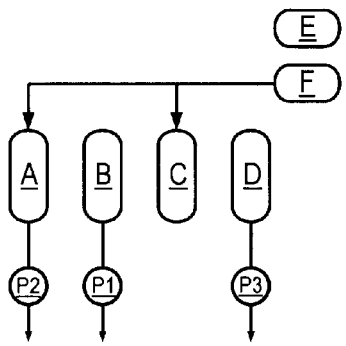
Figure 3D:
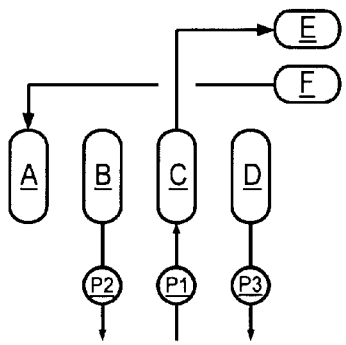

Turning now to the drawings, and particularly to FIG. 1, there is illustrated therein an adsorption system comprising four adsorption vessels, A–D, arranged in parallel, a nonadsorbed gas product storage container, E, an intermediate gas storage vessel, F, a positive displacement gas pump, P1, two non-positive displacement gas pumps, P2 and P3, and piping with valves for transporting the various gas streams through the system. Vessels A–D are preferably identical and each is packed with an adsorbent which selectively adsorbs one or more gas components of the feed gas to the system more readily than it adsorbs one or more other components of the feed gas.

Gas storage vessels E and F are conventional gas storage tanks, and they may be packed with an adsorbent, if desired, or devoid of packing.

As used in this description, the term "gas pumping means", or any equivalent expression used herein, means any gas pumping device useful for transporting a gas from one point to another, including gas compressors, blowers, reciprocating pumps, cam lobe pumps, "Roots" pumps, eductors, etc. The gas pumping device may be single stage or multiple stage. In general, pumps P1, P2 and P3 may be any type of gas pumping means. In a preferred embodiment, pump P1 is a positive displacement gas pump, such as a reciprocating pump, cam pump or a Roots pump, etc., which can efficiently pump gas into and out of the vessels of the system during the adsorption and first evacuation steps. Pump P1 preferably operates efficiently at both superatmospheric and subatmospheric pressures since it will be used to introduce feed gas into the system at atmospheric or above-atmospheric pressures as well as evacuate the adsorption vessels during part of the adsorbent regeneration step. Pumps P2 and P3 are preferably non-positive displacement pumps that operate efficiently under vacuum conditions, such as centrifugal and propeller or blower pumps.

In the system of FIG. 1, feed gas supply line 2, fitted with valve 4, connects a source of feed gas to the inlet end of pump P1. Line 2 is connected on its upstream end with a source of feed gas, which, in the case of air separation is the atmosphere. Pump P1 discharge line 6, provided with valve 8, connects the outlet end of pump P1 to line 10, which, in turn, is connected to feed manifolds 12 and 14. Manifold 12 is connected to vessel A and B gas inlet lines 16 and 18 via valves 20 and 22, respectively, and manifold 14 is connected to vessel C and D gas inlet lines 24 and 26 via valves 28 and 30, respectively. Exhaust gas manifold 32 is also connected to lines 16 and 18 via valves 34 and 36, respectively, and exhaust manifold 38 is connected to feed lines 24 and 26 via valves 40 and 42, respectively. Manifolds 32 and 38 are connected to line 44, which is connected to feed line 2 via line 46, which is fitted with valve 48. Line 6 is connected to waste gas discharge line 50, which is provided with valve 52. Line 50 is vented to the atmosphere or connected to a downstream waste gas discharge point. Waste gas manifold 54 is connected to lines 16 and 18 through valves 56 and 58. Manifold 54 is also connected, at a point between valves 56 and 58 to pump P2 feed line 60. Pump P2 discharge line 62 is connected to line 50 at a point downstream of valve 52. Waste gas manifold 64 is connected to lines 24 and 26 through valves 66 and 68. Manifold 64 is also connected, at a point between valves 66 and 68 to pump P3 feed line 70. Pump P3 discharge line 72 is connected to line 62.

Nonadsorbed product gas manifold 74 is connected to vessel A nonadsorbed gas discharge line 76 and vessel B nonadsorbed gas discharge line 78 through valves 80 and 82, respectively. Manifold 74 is also connected to nonadsorbed gas product line 84 at a point between valves 80 and 82. Line 84, on its downstream end, is connected to nonadsorbed product gas storage vessel E. Nonadsorbed product gas manifold 86 is connected to vessel C nonadsorbed gas discharge line 88 and vessel D nonadsorbed gas discharge line 90 through valves 92 and 94, respectively. Manifold 86 is also connected to nonadsorbed gas product line 96 at a point between valves 92 and 94. Line 96, on its downstream end, is connected to nonadsorbed product gas storage vessel E. Line 98 connects vessel E to a downstream nonadsorbed product gas application or gas shipping point. Intermediate gas manifold 100 is joined to lines 76 and 78 through valves 102 and 104. Manifold 100 is also joined to line 106 at a point between valves 102 and 104. Intermediate gas manifold 108 is joined to lines 88 and 90 through valves 110 and 112. Manifold 108 is also joined to line 114 at a point between valves 110 and 112. Lines 106 and 114 are joined to intermediate gas storage vessel F. Line 116, fitted with valve 118, is open to the atmosphere at its upstream end and is connected to line 10 at its downstream end.

Note that in the system shown in FIG. 1, pump P1 is used to pump feed air into all four vessels of the system, and it can be used to evacuate any of the four vessels. In FIG. 1, pump P2 is set up to evacuate vessels A and B and pump P3 is set up to evacuate vessels C and D, although this arrangement is a matter of choice. In a broader embodiment, the feed lines to pumps P2 and P3 can be cross-connected so that each of these pumps can be used to evacuate any two adsorption vessels.

FIGS. 2A–2L illustrate the steps in a preferred embodiment of the invention. Table I outlines the activity occurring in each vessel in each step of this preferred version of the process. In this embodiment, each vessel undergoes the same series of steps, which are: feed with pump P1 (adsorption), cocurrent depressurization to tank F, countercurrent evacuation with pump P1, countercurrent evacuation with pump P2 or pump P3, purge with gas from tank F, backfill with product gas from tank E and feed repressurization without use of pumps P1–P3.

TABLE 1

| Step | Bed A | Bed B | Bed C | Bed D |
| --- | --- | --- | --- | --- |
| 2A | Feed, Pump 1 | Evac., Pump 2 | Dep. To Tank F | Evac., Pump 3 |
| 2B | Dep. To Tank F | Evac., Pump 2 | Evac., Pump 1 | Purge fr. Tank F |

TABLE 1-continued

| Step | Bed A | Bed B | Bed C | Bed D |
| --- | --- | --- | --- | --- |
| 2C | Evac., Pump 1 | Purge fr. Tank F | Evac., Pump 3 | Backfill fr. Tank E |
| 2D | Evac., Pump 1 | Purge fr. Tank F | Evac., Pump 3 | Press., no pump |
| 2E | Evac., Pump 2 | Backfill fr. Tank E | Evac., Pump 3 | Feed, Pump 1 |
| 2F | Evac., Pump 2 | Press., no pump | Evac., Pump 3 | Feed, Pump 1 |
| 2G | Evac., Pump 2 | Feed, Pump 1 | Evac., Pump 3 | Dep. To Tank F |
| 2H | Evac., Pump 2 | Dep. To Tank F | Purge fr. Tank F | Evac., Pump 1 |
| 2I | Purge fr. Tank F | Evac., Pump 1 | Backfill fr. Tank E | Evac., Pump 3 |
| 2J | Purge fr. Tank F | Evac., Pump 1 | Press., no pump | Evac., Pump 3 |
| 2K | Backfill fr. Tank E | Evac., Pump 2 | Feed, Pump 1 | Evac., Pump 3 |
| 2L | Press., no pump | Evac., Pump 2 | Feed, Pump 1 | Evac., Pump 3 |

Several aspects of the particular preferred cycle outlined in Table 1 are apparent. First, the beds in vessels A and B and in vessels C and D are operated as pairs, each pair being operated one-half cycle out of phase, i. e., beds B and D operate one-half phase behind beds A and C, respectively. Secondly, the beds of each pair undergo identical step durations, however, the duration of a given step in one pair of beds is not necessarily the same as the duration of the same step in the other pair of beds. For instance, note that in the cycle of beds A and B, the feed step takes up only one of the twelve apparent steps whereas in the cycle of beds C and D, the feed step takes up two of the twelve apparent steps. The same is true of other steps in the cycles, such as the evacuation of the vessels with pump P1. Thirdly, each pair of beds operates on a cycle which is out of phase with the cycle on which the other pair of beds operates, and the cycle of one pair of beds is not necessarily one-half cycle out of phase with the cycle of the other pair of beds. In other words, The cycle practiced in either bed C or bed D is not necessarily one-quarter cycle behind the cycle practiced in either bed A or bed B.

There are also invariable factors that may not be apparent from Table 1. First, even though the durations of the same steps carried out in each pair of beds is not necessarily the same, the total duration of all steps of the cycle practiced in each bed is the same. In other words, the duration of the step carried out in each of the four beds in any one of the twelve stated steps of the cycle is the same. This must be true; otherwise the relative position of the two pairs of beds would continually change during the process. Secondly, even though it appears from Table I that each of the twelve steps are of equal duration, this is not necessarily true. The relative durations of the various steps may be different. For example, steps 2A and 2G may be longer than steps 2E and 2K or steps 2F and 2L or all four of these to compensate for the fact that the adsorption step in vessels A and B takes up only one step while the adsorption step in vessels C and D takes up two steps.

The process of the invention will now be described as it applies to the separation of air to produce an oxygen-enriched nonadsorbed gas product in the system illustrated in FIG. 1 according to the broad embodiment which includes the steps: adsorption, cocurrent depressurization, evacuation with pump P1, evacuation with pump P2 (or pump P3), purge and at least partial repressurization with nonadsorbed product gas. Any further pressurization required to bring the adsorption vessel to the desired adsorption pressure can be accomplished at the beginning of the adsorption step. The cycle comprising the steps of this embodiment is illustrated in FIGS. 2A, 2B, 2C, 2E, 2G, 2H, 2I and 2K. An outline of these steps appears in Table II.

TABLE II

| Step | Bed A | Bed B | Bed C | Bed D |
| --- | --- | --- | --- | --- |
| 2A | Feed, Pump 1 | Evac., Pump 2 | Dep. To Tank F | Evac., Pump 3 |
| 2B | Dep. To Tank F | Evac., Pump 2 | Evac., Pump 1 | Purge fr. Tank F |
| 2C | Evac., Pump 1 | Purge fr. Tank F | Evac., Pump 3 | Backfill fr. Tnk E |
| 2E | Evac., Pump 2 | Backfill fr. Tnk E | Evac., Pump 3 | Feed, Pump 1 |
| 2G | Evac., Pump 2 | Feed, Pump 1 | Evac., Pump 3 | Dep. To Tank F |
| 2H | Evac., Pump 2 | Dep. To Tank F | Purge fr. Tank F | Evac., Pump 1 |
| 2I | Purge fr. Tank F | Evac., Pump 1 | Backfill fr. Tnk E | Evac., Pump 3 |
| 2K | Backfill fr. Tnk E | Evac., Pump 2 | Feed, Pump 1 | Evac., Pump 3 |

In step 2A, the first step of the process according to this embodiment, vessel A is in the fractionation step (also known as the adsorption or production step), and air is being forced into this vessel by pump P1, vessel B is being evacuated with pump P2, vessel C is undergoing cocurrent depressurization to intermediate storage tank F and vessel D is being evacuated with pump P3. Just prior to step 2A, vessel A has been pressurized with air to the desired adsorption pressure. During step 2A, valves 4, 8, 20, 58, 68, 80 and 110 are open and all other valves are closed. Ambient air at atmospheric pressure is drawn into the system through line 2 by pump P1 and charged into vessel A through lines 6, 10, 12 and 16. As the air passes through vessel A, nitrogen is adsorbed from the air and oxygen-enriched air product passes out of vessel A and into vessel E through lines 76, 74 and 84. The oxygen product gas is stored in vessel E, from which product is drawn, as needed, through line 98.

Meanwhile, vessel B is being evacuated by pump P2, and gas from vessel B is drawn 15 through lines 18, 54 and 60 by pump P2 and discharged from the system through lines 62 and 50. Also, vessel C, which has just finished its adsorption step, undergoes cocurrent depressurization, during which gas flows from vessel C through lines 88, 108 and 114 and into vessel F. Also, vessel D is being evacuated by pump P3 and gas from vessel D is drawn through lines 26, 64 and 70 by pump P3 and discharged from the system through lines 72, 62 and 50.

As the adsorption step in vessel A proceeds, the adsorbed nitrogen front advances cocurrently through the bed of adsorbent toward the nonadsorbed product outlet end of vessel A. At a predetermined time, usually when the nitrogen from in vessel reaches the desired end point, which is preferably prior to breakthrough of nitrogen into line 76, step 2A is terminated and step 2B begins.

During step 2B, valves 40, 48, 52, 58, 68, 102 and 112 are open and all other valves are closed. In step 2B, vessel A undergoes cocurrent depressurization, vessel B continues countercurrent evacuation by pump P2, vessel C begins countercurrent evacuation by pump P1 and vessel D is purged with gas withdrawn from tank F by pump P3. During this step, gas flows from vessel A through lines 76, 100 and 106 and into vessel F; nitrogen-rich gas is desorbed from the adsorbent in vessel B and evacuated from the system through lines 18, 54, 60, 62 and 50; gas is evacuated from vessel C and discharged from the system through lines 24, 38, 44, 46, 2 and 50; and purge gas from tank F purges residual nitrogen from the adsorbent in vessel D via lines 114, 108, 90, and leaves the system through lines 26, 64, 70, 72, 62 and 50. At a preselected time, step 2B is terminated and step 2C begins.

During step 2C, valves 34, 48, 52, 58, 66, 94 and 104 are open and all other valves are closed. In step 2C, vessel A is partially evacuated by pump P1, the adsorbent in vessel B is purged with gas from tank F, vessel C begins countercurrent evacuation by pump P3 and vessel D is partially repressurized with product gas from vessel E. Gas passes out of vessel A and the system through lines 16, 32, 44, 46, 2 and 50; purge gas from tank F purges residual nitrogen from the adsorbent in vessel B via lines 106, 100 and 78, and the purge stream is discharged from the system through lines 18, 54, 60, 62 and 50; nitrogen-rich gas is desorbed from the adsorbent in vessel C and removed from the system through lines 24, 64, 70, 72, 62 and 50; and product gas flows from tank E into vessel D through lines 96, 86 and 90. At a preset time, step 2C is terminated and step 2E begins.

During step 2E, valves 4, 8, 30, 56, 66, 82 and 94 are open and all other valves are closed, and vessel A begins countercurrent evacuation by pump P2, vessel B is partially repressurized with product gas from tank E, vessel C continues evacuation by pump P3 and vessel D undergoes its adsorption step. In this step, nitrogen-rich gas is desorbed from the adsorbent in vessel A and removed from the system through lines 16, 54, 60, 62 and 50; product gas flows from tank E into vessel B through lines 84, 74 and 78; nitrogen-rich gas is desorbed from the adsorbent in vessel C and removed from the system through lines 24, 64, 70, 72, 62 and 50; and feed air is charged into vessel D by pump P1 through lines 2, 6, 10, 14 and 26 while oxygen rich gas leaves vessel D and enters tank E through lines 90, 86 and 96. When the nitrogen front reaches the desired point in vessel D, step 2E is terminated and step 2G begins.

During step 2G, valves 4, 8, 22, 56, 66 and 112 are open and all other valves are closed, and vessel A continues countercurrent evacuation by pump P2, vessel B enters its adsorption step, vessel C continues countercurrent evacuation by pump P3 and vessel D undergoes cocurrent depressurization to vessel F. In this step, nitrogen-rich gas continues to be desorbed from the adsorbent in vessel A and removed from the system through lines 16, 54, 60, 62 and 50; feed air is charged into vessel B through by pump P1 via lines 2, 6, 10, 12 and 18 while oxygen rich gas leaves vessel D and enters tank E through lines 78, 74 and 84; nitrogen-rich gas continues to be desorbed from the adsorbent in vessel C and removed from the system through lines 24, 64, 70, 72, 62 and 50; and gas flows from vessel D to tank F through lines 90, 108 and 114. When the nitrogen front passing through vessel B reaches the desired point, step 2G is terminated and step 2H begins.

During step 2H, valves 22, 42, 48, 52, 56, 66, 104 and 110 are open and all other valves are closed, and vessel A continues countercurrent evacuation by pump P2, vessel B undergoes cocurrent depressurization to vessel F, the adsorbent in vessel C is purged with gas withdrawn from tank F by pump P3 and vessel D begins countercurrent evacuation by pump P1. In this step, nitrogen-rich gas continues to be desorbed from the adsorbent in vessel A and removed from the system through lines 16, 54, 60, 62 and 50; gas flows from vessel B to tank F through lines 78, 100 and 106; purge gas flows from tank F to vessel C via lines 114, 108 and 88, purges residual nitrogen from the adsorbent in vessel C, and the purge stream is discharged from the system through lines 24, 64, 70, 72, 62 and 50; and gas passes out of vessel D and the system through lines 26, 38, 44, 46, 2 and 50. At a preset time, step 2H is terminated and step 21 begins.

During step 21, valves 36, 48, 52, 56, 68, 92 and 102 are open and all other valves are closed. In step 21, vessel A is purged with gas from vessel F while vessel F is evacuated by pump P2; vessel B begins countercurrent evacuation by pump P1; vessel C is partially repressurized with product gas from vessel E; and vessel D begins countercurrent evacuation by pump P3. In this step purge gas from tank F passes to vessel A via lines 106, 100 and 76, purges residual nitrogen from the adsorbent in vessel, and the purge stream is discharged from the system through lines 16, 54, 60, 62 and 50; gas passes out of vessel A and the system through lines 16, 32, 44, 46, 2 and 50; gas passes out of vessel B and the system through lines 18, 32, 44, 46, 2 and 50; product gas flows from tank E into vessel C through lines 96, 86 and 88; and nitrogen-rich gas begins to be desorbed from the adsorbent in vessel D and is removed from the system through lines 26, 64, 70, 72, 62 and 50. At a predetermined time, step 21 is terminated and step 2K begins.

During step 2K, valves 4, 8, 28, 58, 68, 80 and 92 are open and all other valves are closed, and vessel A is partially repressurized with product gas from tank E, vessel B begins countercurrent evacuation by pump P2, vessel C undergoes its adsorption step and vessel D continues countercurrent evacuation by pump P3. In this step, product gas flows from tank E into vessel A through lines 84, 74 and 76; nitrogen-rich gas is desorbed from the adsorbent in vessel B and removed from the system through lines 18, 54, 60, 62 and 50; feed air is charged into vessel C by pump P1 through lines 2, 6, 10, 14 and 24 while oxygen rich gas leaves vessel D and enters tank E through lines 88, 86 and 96; and nitrogen-rich gas is desorbed from the adsorbent in vessel D and removed from the system through lines 26, 64, 70, 72, 62 and 50. At the preset time step 2K is terminated.

This concludes the cycle of the process under the first broad embodiment. The next cycle begins with step 2A, and the cycle is continually repeated throughout the process. As is shown from the figures of the selected steps, pumps P1, P2 and P3 are in continuous operation throughout the process.

The process of the invention will next be described as it applies to the separation of air to produce an oxygen-enriched nonadsorbed gas product in the system illustrated in FIG. 1 according to the broad embodiment of the invention which includes the steps: adsorption, cocurrent depressurization, evacuation with pump P1, evacuation with pump P2 (or pump P3), purge and repressurization with atmospheric air. The cycle comprising the steps is illustrated in FIGS. 2A, 2B, 2C, 2D, 2G, 2H, 2J and 2L. An outline of these steps appears in Table III.

TABLE III

| Step | Bed A | Bed B | Bed C | Bed D |
|---|---|---|---|---|
| 2A | Feed, Pump 1 | Evac., Pump 2 | Dep. To Tank F | Evac., Pump 3 |
| 2B | Dep. To Tank F | Evac., Pump 2 | Evac., Pump 1 | Purge fr. Tank F |
| 2C | Evac., Pump 1 | Purge fr. Tank F | Evac., Pump 3 | Backfill fr. Tank E |
| 2D | Evac., Pump 2 | Purge fr. Tank F | Evac., Pump 3 | Press., no pump |

TABLE III-continued

| Step | Bed A | Bed B | Bed C | Bed D |
|------|-------|-------|-------|-------|
| 2G | Evac, Pump 2 | Feed, Pump 1 | Evac., Pump 3 | Dep. To Tank F |
| 2H | Evac, Pump 2 | Dep. To Tank F | Purge fr. Tank F | Evac., Pump 1 |
| 2J | Purge fr. Tank F | Evac., Pump 1 | Press., no pump | Evac., Pump 3 |
| 2L | Press., no pump | Evac., Pump 2 | Feed, Pump 1 | Evac., Pump 3 |

In this version of the process of the invention, steps 2A, 2B, 2G and 2H are the same as these steps in the cycle described above; accordingly, these steps will not be described in this embodiment. Description of the cycle begins with step 2D.

During step 2D, valves 30, 34, 48, 52, 58, 66, 104 and 118 are open and all other valves are closed. Vessel A begins countercurrent evacuation by pump P1, the adsorbent in vessel B is purged with gas withdrawn from tank F by pump P2, vessel C begins countercurrent evacuation by pump P3 and vessel D is partially repressurized with feed air without a pump. In this step, gas passes out of vessel A and the system through lines 16, 32, 44, 46, 2 and 50; purge gas flows from tank F to vessel B via lines 106, 100 and 78, purges residual nitrogen from the adsorbent in vessel B, and the purge stream is discharged from the system through lines 18, 54, 60, 62 and 50; nitrogen-rich gas begins to be desorbed from the adsorbent in vessel C and removed from the system through lines 24, 64, 70, 72, 62 and 50; and feed air enters the system through line 116 and passes into vessel D through lines 10, 14 and 26. At the preset time, step 2D is terminated and step 2F begins.

During step 2F, valves 4, 8, 22, 30, 56, 68, 94 and 118 are open and all other valves are closed, and vessel A begins countercurrent evacuation by pump P2, vessel B is partially repressurized with feed air without a pump, vessel C continues countercurrent evacuation by pump P3 and vessel D begins the adsorption step. In this step, nitrogen-rich gas desorbed from the adsorbent in vessel A is removed from the system through lines 16, 54, 60, 62 and 50; feed air enters the system through line 116 and passes into vessel B through lines 10, 12 and 18; nitrogen-rich gas continues to be desorbed from the adsorbent in vessel A and is removed from the system through lines 24, 64, 70, 72, 62 and 50; enters tank E through lines 90, 86 and 96; nitrogen-rich gas continues to be desorbed from the adsorbent in vessel C and removed from the system through lines 24, 64, 70, 72, 62 and 50; and feed air is charged into vessel D by pump P1 via lines 2, 6, 10, 14 and 26 while oxygen rich gas flows from vessel D to tank E through lines 90, 86 and 96. When the nitrogen front passing through vessel D reaches the desired point, step 2F is terminated and step 2G begins.

Steps 2G and 2H are described above. Upon completion of step 2G, step 2J begins.

During step 2J, valves 4, 8, 22, 30, 56, 68, 94 and 118 are open and all other valves are closed, valves 40, 48, 52, 58, 68, and 102 are open and all other valves are closed. Vessel A is purged with gas withdrawn from tank F by pump P2, vessel B begins countercurrent evacuation by pump P1, vessel C is partially repressurized with feed air without a pump and vessel D begins countercurrent evacuation with pump P3. In this step, purge gas from tank F, passes through lines 106, 100, 90, purges residual nitrogen from the adsorbent in vessel A and leaves the system through lines 16, 54, 60, 62 and 50; gas is evacuated from vessel B and discharged from the system through lines 18, 32, 44, 46, 2 and 50; feed air enters the system through line 116 and passes into vessel C through lines 10, 14 and 24, and nitrogen-rich gas is desorbed from the adsorbent in vessel D and evacuated from the system through lines 24, 64, 70, 72, 62 and 50. At the predetermined time, step 2J is terminated and step 2L begins.

During step 2L, valves 4, 8, 20, 28, 58, 68, 92 and 118 are open and all other valves are closed. Vessel A is partially repressurized with feed air without a pump, vessel B begins countercurrent evacuation by pump P2, vessel C undergoes its adsorption step and vessel D continues countercurrent evacuation by pump P3. In this step, feed air enters the system through line 116 and passes into vessel A through lines 10, 12 and 16, nitrogen-rich gas is desorbed from the adsorbent in vessel B and removed from the system through lines 18, 54, 60, 62 and 50; feed air is charged into vessel C by pump P1 through lines 2, 6, 10, 14 and 24 while oxygen rich gas leaves vessel D and enters tank E through lines 88, 86 and 96; and nitrogen-rich gas is desorbed from the adsorbent in vessel D and removed from the system through lines 26, 64, 70, 72, 62 and 50. At the predetermined time step 2K is terminated.

This concludes the cycle of the process under this second broad embodiment. The next cycle begins with step 2A, and the cycle is continually repeated throughout the process. As is shown from the figures of the selected steps, pumps P1, P2 and P3 are in continuous operation throughout the process.

A preferred embodiment of the invention includes all of the steps described above in Table I and illustrated in FIGS. 2A–2L. The individual steps of this preferred embodiment are clearly described in the above two embodiments; accordingly further discussion of these steps at this point is unnecessary.

A more preferred embodiment of the invention comprises a combination of steps 2A–2L and the steps illustrated in FIGS. 3A to 3D. In this embodiment, step 3A follows step 2B, step 3B follows step 2D, step 3C follows step 2H and step 3D follows 2J, as shown in Table 4.

TABLE 4

| Step | Bed A | Bed B | Bed C | Bed D |
|------|-------|-------|-------|-------|
| 2A | Feed, Pump 1 | Evac., Pump 2 | Dep. To Tank F | Evac., Pump 3 |
| 2B | Dep. To Tank F | Evac., Pump 2 | Evac., Pump 1 | Purge fr. Tank 2 |
| 3A | Evac., Pump 1 | Purge fr. Tank F | Evac., Pump 3 | Backfill fr. Tank F |
| 2C | Evac., Pump 1 | Purge fr. Tank F | Evac., Pump 3 | Backfill fr. Tank E |
| 2D | Evac., Pump 1 | Purge fr. Tank F | Evac., Pump 3 | Press., no pump |
| 3B | Evac., Pump 2 | Backfill fr. Tank F | Evac., Pump 3 | Feed, Pump 1 |
| 2E | Evac., Pump 2 | Backfill fr. Tank E | Evac., Pump 3 | Feed, Pump 1 |
| 2F | Evac., Pump 2 | Press., no pump | Evac., Pump 3 | Feed, Pump 1 |
| 2G | Evac., Pump 2 | Feed, Pump 1 | Evac., Pump 3 | Dep. To Tank F |
| 2H | Evac., Pump 2 | Dep. To Tank F | Purge fr. Tank F | Evac., Pump 1 |
| 3C | Purge fr. Tank F | Evac., Pump 1 | Backfill fr. Tank F | Evac., Pump 3 |
| 2I | Purge fr. Tank F | Evac., Pump 1 | Backfill fr. Tank E | Evac., Pump 3 |
| 2J | Purge fr. Tank F | Evac., Pump 1 | Press., no pump | Evac., Pump 3 |

TABLE 4-continued

| Step | Bed A | Bed B | Bed C | Bed D |
|---|---|---|---|---|
| 3D | Backfill fr. Tank F | Evac., Pump 2 | Feed, Pump 1 | Evac., Pump 3 |
| 2K | Backfill fr. Tank E | Evac., Pump 2 | Feed, Pump 1 | Evac., Pump 3 |
| 2L | Press., no pump | Evac., Pump 2 | Feed, Pump 1 | Evac., Pump 3 |

In this version of the process of the invention, steps 2A–2L are the same as these steps in the cycles described above; accordingly, the description of these steps will not be repeated here. The cycle begins with step 2A, which is followed by step 2B. Detailed description begins with step 3A.

During step 3A, valves 34, 48, 52, 58, 66, 104 and 110 are open and all other valves are closed. Vessel A begins countercurrent evacuation by pump P1, the adsorbent in vessel B is purged with gas withdrawn from tank F by pump P2, vessel C begins countercurrent evacuation by pump P3 and vessel D is partially repressurized with gas from vessel F. In this step, gas passes out of vessel A and the system through lines 16, 32, 44, 46, 2 and 50; purge gas flows from tank F to vessel B via lines 106, 100 and 78, purges residual nitrogen from the adsorbent in vessel B, and the purge stream is discharged from the system through lines 18, 54, 60, 62 and 50; nitrogen-rich gas begins to be desorbed from the adsorbent in vessel C and removed from the system through lines 24, 64, 70, 72, 62 and 50; and gas flows from tank F to vessel D via lines 114, 108 and 90. At the preset time, step 3A is terminated and step 2C begins.

Steps 2C and 2D are as described above, and step 3B follows step 2D.

During step 3B, valves 4, 8, 30, 56, 66, 94 and 104 are open and all other valves are closed. Vessel A begins countercurrent evacuation by pump P2, vessel B is partially repressurized with gas from vessel F, vessel C continues to undergo countercurrent evacuation with pump P3 and vessel D enters its adsorption step. In this step, nitrogen-rich gas is desorbed from the adsorbent in vessel A and removed from the system through lines 16, 54, 60, 62 and 50; gas flows from tank F to vessel B through lines 106, 100 and 78; nitrogen-rich gas continues to be desorbed from the adsorbent in vessel C and removed from the system through lines 24, 64, 70, 72, 62 and 50; and feed air is charged into vessel D by pump P1 via lines 2, 6, 10, 14 and 26 while oxygen rich gas leaves vessel D and enters tank E through lines 90, 86 and 96. At a preset time, step 3B is terminated and step 2E begins.

Steps 2E, 2F, 2G and 2H are as described above, and step 3C follows step 2H.

During step 3C, valves 36, 48, 52, 56, 68 and 110 are open and all other valves are closed. The adsorbent in vessel A is purged with gas from tank F, vessel B is partially evacuated by pump P1, vessel C is partially repressurized with product gas from vessel F and vessel D begins countercurrent evacuation by pump P3. In step 3C, purge gas from tank F purges residual nitrogen from the adsorbent in vessel A via lines 106, 100 and 76, and the purge stream is discharged from the system through lines 16, 54, 60, 62 and 50; gas passes out of vessel B and the system through lines 18, 32, 44, 46, 2 and 50; gas flows from tank F to vessel C through lines 114, 108 and 88; and nitrogen-rich gas is desorbed from the adsorbent in vessel D and removed from the system through lines 26, 64, 70, 72, 62 and 50, At the preset time, step 3C is terminated and step 2I begins.

Steps 2I and 2J are as described above, and step 3D follows step 2J.

During step 3D, valves 4, 8, 28, 58, 68, 92 and 102 are open and all other valves are closed. Vessel A is partially repressurized with product gas from tank F, vessel B begins countercurrent evacuation by pump P2, vessel C undergoes its adsorption step and vessel D continues countercurrent evacuation by pump P3. In this step, gas flows from tank F into vessel A through lines 106, 100 and 76; nitrogen-rich gas is desorbed from the adsorbent in vessel B and removed from the system through lines 18, 54, 60, 62 and 50; feed air is charged into vessel C by pump P1 through lines 2, 6, 10, 14 and 24 while oxygen rich gas leaves vessel D and enters tank E through lines 88, 86 and 96; and nitrogen-rich gas continues to be desorbed from the adsorbent in vessel D and removed from the system through lines 26, 64, 70, 72, 62 and 50. At the preset time step 3D is terminated and step 2K begins Steps 2K and 2L are as described above. At the completion of step 2L, the first cycle of the process ends and the cycle is continually repeated, beginning with step 2A.

Although steps 3A–3D are described in conjunction with steps 2A–2L of the preferred embodiment, steps 3A–3D can also be combined with the cycles described in Table II and Table III. In the former case, steps 3A, 3B, 3C and 3D would follow steps 2B, 2C, 2H and 2J, respectively, and in the latter case they would follow steps 2B, 2D, 2H and 2J, respectively.

Typical step durations for the steps illustrated in Table 4 are: steps 2A, 2B, 2D, 2G and 2H—about 3–20 secs.; and steps 3C, 2C, 3B, 2E, 2F, 3C, 2I, 3D, 2K and 2L—about 1–10 secs. Typical pressures in vessel A at the end of operations are: step 2A—1–5 bara; step 2B—0.34 bara; step 2D—0.2–3 bara; step 2H—0.1–2 bara; step 2J—0.1–2 bara; step 3D—0.2–3 bara; step 2K—0.2–4 bara; and step 2L—0.3–1 bara.

It will be appreciated that it is within the scope of the present invention to utilize conventional equipment to monitor and automatically regulate the flow of gases within the system so that it can be fully automated to run continuously in an efficient manner.

The invention is further illustrated by the following example in which, unless otherwise indicated, parts, percentages and ratios are on a volume basis.

EXAMPLE

This hypothetical example illustrates use of the process of the invention to separate air into an oxygen-enriched gas product and an oxygen-depleted gas product using the sequence of steps shown in Table 4. The example will be carried out using four identical cylindrical adsorption vessels each packed with lithium-exchanged type X zeolite. The system will be operated to produce an oxygen-enriched gas product containing about 90% by volume oxygen. With reference to Table 4, the step durations are: steps 2A, 2B, 2G and 2H—10 secs.; steps 3A, 2C, 3B, 2E, 3C, 2I, and 2K—3 secs.; and steps 2D, 2F, 2J and 2L—4 secs. Also with reference to Table 4, the pressure in vessel A at the end of each operation are: step 2A—1.36 bara, step 2B—100 bara, step 2D—0.54 bara, step 2H—0.35 bara, step 2J—0.54 bara, step 3D—0.59 bara, step 2K—0.65 bara and step 2L—1.00 bara. The specific product obtained in this experiment will be about 36 $Nm^3/Hr/m^3$ (normal cubic meters of nonadsorbed product gas per hour per cubic meter of adsorbent). The yield (defined as the total number of moles of oxygen contained in the nonadsorbed product gas divided by the total number of moles of oxygen contained in the feed gas) will be about 63%. The calculated power consumption will be about 0.303 Kwh/Nm$^3$O$_2$(kilowatt hours per normal cubic meter of oxygen-enriched gas produced).

Although the invention has been described with particular reference to specific equipment arrangements and to specific experiments, these features are merely exemplary of the invention and variations are contemplated. For example, although the drawings include storage tanks E and F and these tanks are used to describe the various embodiments of the invention, the process can be practiced without the use of these tanks. For example, the purge steps carried out in step 2B, for instance, can be conducted without the use of tank F, by directly purging vessel D with gas from vessel A. Furthermore, the activity taking place in one or both adsorbers during one step may overlap with the activity taking place in one or both adsorbers during the following step. For example, the partial pressurization of vessel A with gas stored in tank C, shown in FIGS. 2C, 2D, 2I and 2K, may partially coincide with the repressurization step shown in steps 2D, 2F, 2J and 2L, respectively. Additionally, the process may include steps other than those illustrated in the tables, such as bed equalization. The scope of the invention is limited only by the breadth of the appended claims.

What is claimed is:

1. A pressure swing adsorption process for producing first component-enriched gas from a gas mixture containing first and second components in a system comprising four adsorption zones each containing an adsorbent which selectively adsorbs said second component, a first gas pumping means, and at least one second gas pumping means, comprising repeatedly performing in each adsorption zone the following sequence of steps:

(i) producing first component-enriched gas by cocurrently introducing said gas mixture into said adsorption zone at a selected adsorption pressure and cocurrently removing first component-enriched gas therefrom;

(ii) partially depressurizing said adsorption zone by cocurrently removing partially fractionated gas therefrom;

(iii) further depressurizing said adsorption vessel by countercurrently withdrawing second component-enriched gas therefrom;

(iv) further depressurizing said adsorption vessel by countercurrently withdrawing second component-enriched gas therefrom;

(v) purging said adsorption zone by introducing (a) first component-enriched gas, (b) partially fractionated gas or (c) combinations of these countercurrently thereinto while countercurrently withdrawing gas therefrom; and (vi) at least partially repressurizing said adsorption vessel by introducing: (a) first component-enriched gas countercurrently thereinto, (b) partially fractionated gas countercurrently thereinto (c) said gas mixture cocurrently thereinto, or (d) by combinations of two or more of (a), (b) and (c); said first gas pumping means being used exclusively for steps (i) and (iii) in all adsorption vessels and said at least one second gas pumping means being used exclusively for steps (iv) and (v) in all vessels.

2. The process of claim 1, wherein said first gas pumping means being in continuous service.

3. The process of claim 2, wherein said at least one second gas pumping means is in continuous service.

4. The process of claim 3, wherein said first gas pumping means is positive displacement gas pumping means and said at least one second gas pumping means is non-positive displacement gas pumping means.

5. The process of claim 4, wherein said at least one second gas pumping means comprises two gas pumping means.

6. The process of claim 5, wherein one second gas pumping means is used exclusively for two adsorption zones and the other second gas pumping means is used exclusively for the other two adsorption zones.

7. The process of claim 6, wherein said two adsorption zones comprise a first pair of adsorption zones and said other two adsorption zones comprise a second pair of adsorption zones and the phasing of each pair of adsorption zones is such that the cycle of one adsorption zone of a pair lags behind the cycle of the other adsorption zone of that pair by one half-cycle.

8. The process of claim 2 or claim 7, wherein step (vi) comprises cocurrently introducing said gas mixture into said adsorption vessel.

9. The process of claim 2 or claim 7, wherein step (vi) comprises countercurrently introducing first component-enriched gas into said adsorption vessel and then cocurrently introducing said gas mixture thereinto.

10. The process of claim 2 or claim 7, wherein step (vi) comprises countercurrently introducing first component-enriched gas into said adsorption vessel, then countercurrently introducing first component-enriched gas into said adsorption vessel while cocurrently introducing said gas mixture thereinto, then cocurrently introducing said gas mixture into said adsorption vessel.

11. The process of claim 2 or claim 7, wherein said selected adsorption pressure is in the range of about 1 to about 20 bara.

12. The process of claim 2 or claim 7, wherein during step (iv) the pressure in said adsorption zone is reduced to about 0.1 to about 2 bara.

13. The process of claim 2 or claim 7, wherein said gas mixture is air.

14. The process of claim 13, wherein step (vi) comprises at least partially cocurrently introducing said air into said adsorption vessel at atmospheric pressure.

15. The process of claim 13, wherein said first component is oxygen and said second component is nitrogen.

16. The process of claim 15, wherein said selected adsorption pressure is about 1 to about 5 bara.

17. The process of claim 13, wherein during step (iv) said adsorption vessel is countercurrently evacuated to subatmospheric pressure.

18. A system for fractionating a feed gas comprising:

(a) four adsorption zones arranged in parallel, each adsorption zone having an inlet and outlet and containing an adsorbent which selectively adsorbs one component of said feed gas;

(b) a gas storage container;

(c) positive displacement gas pumping means having an inlet and an outlet;

(d) first and second non-positive displacement gas pumping means, each having an inlet and an outlet;

(e) feed conduit means with valve means connecting a feed gas source to said positive displacement gas pumping means inlet;

(f) conduit means with valve means connecting said positive displacement gas pumping means outlet to the inlet of each adsorption zone;

(g) first adsorption zone evacuation conduit means connecting the inlet of each adsorption zone to said positive displacement gas pumping means inlet, said first adsorption evacuation conduit means including valve means to selectively permit flow of gas from the inlet of each adsorption zone to said positive displacement gas pumping means inlet;

(h) first exhaust gas discharge conduit means with valve means connecting said positive displacement gas pumping means outlet to an exhaust gas discharge point;

(i) second adsorption zone evacuation conduit means connecting the inlets of two adsorption zones to said first non-positive displacement gas pumping means inlet, said second adsorption zone evacuation conduit means including valve means to selectively permit flow of gas from the inlet of either of said two adsorption zones to said first non-positive displacement gas pumping means inlet;

(j) third adsorption zone evacuation conduit means connecting the inlets of the two other adsorption zones to said second non-positive displacement gas pumping means inlet, said second adsorption zone evacuation conduit means including valve means to selectively permit flow of gas from the inlet of either of said two other adsorption zones to said second non-positive displacement gas pumping means inlet;

(k) second exhaust gas discharge conduit means connecting said first and said second non-positive displacement gas pumping means outlets to said exhaust gas discharge point;

(l) product gas conduit means connecting the outlet of each adsorption zone to a product gas discharge point, said product gas conduit means including valve means to selectively permit communication between each of said adsorption zone outlets and said product gas discharge point; and (m) storage conduit means connecting the outlets of each adsorption zone to said gas storage container, said gas storage conduit means including valve Ameans to selectively permit communication between each of said adsorption zone outlets and said gas storage container.

19. The system of claim 18, wherein said second and third adsorption evacuation conduit means are combined, and the valve means of the combined evacuation conduit means selectively permits flow of gas from the inlet of any of the four adsorption zones to the inlet of either said first non-positive displacement gas pumping means or said second non-positive displacement gas pumping means.

20. The system of claim 18 or claim 19, wherein said feed gas is ambient air and each adsorption zone contains an adsorbent which selectively adsorbs nitrogen from air.

* * * * *